Oct. 12, 1926. 1,602,520
W. S. WARD ET AL
BATTERY SUPPORT FOR ELECTRIC VEHICLES
Filed April 3, 1922 2 Sheets-Sheet 2
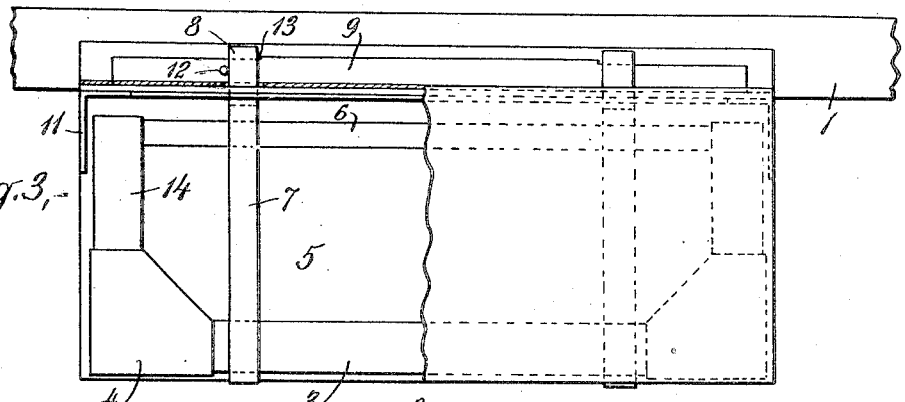
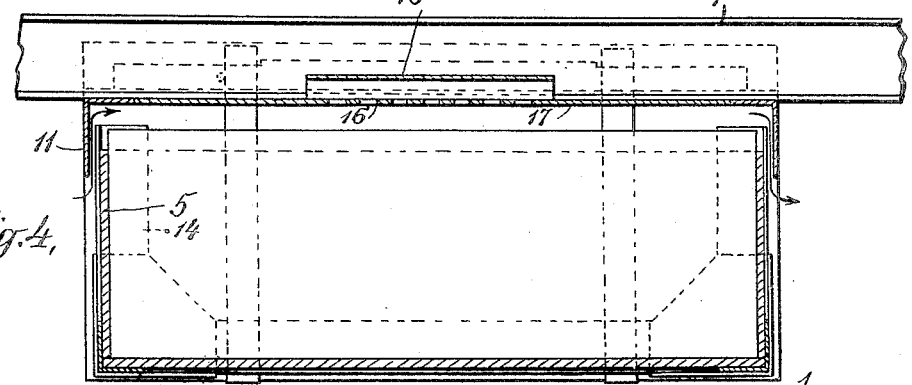
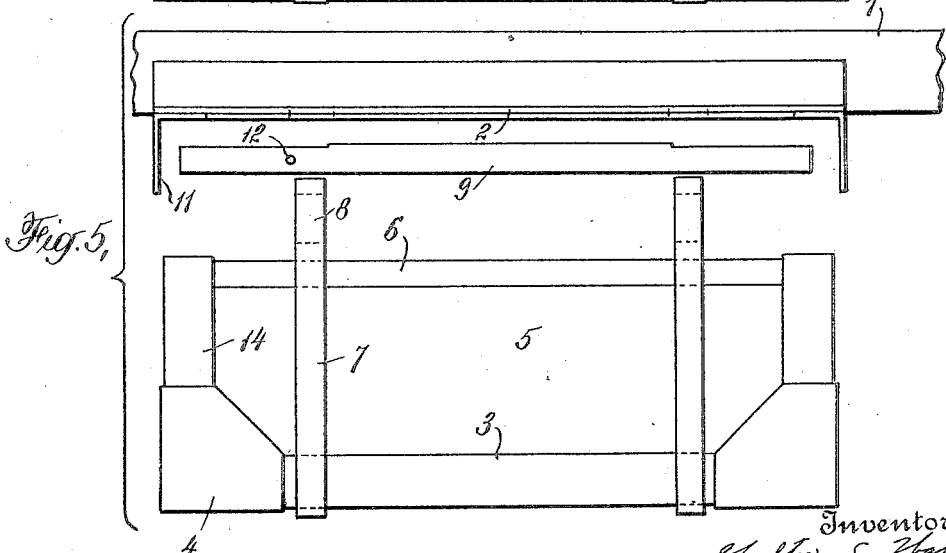

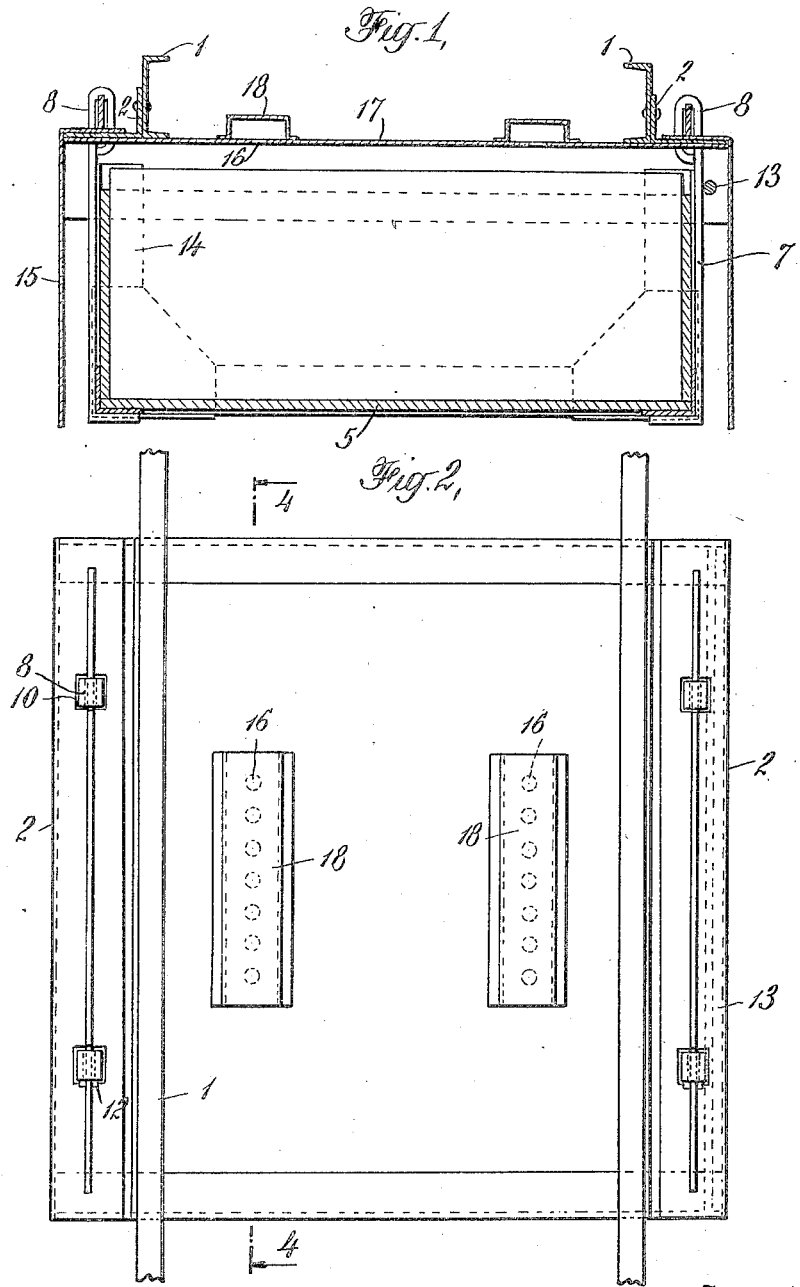

Patented Oct. 12, 1926.

1,602,520

UNITED STATES PATENT OFFICE.

WALTER S. WARD AND BENJAMIN H. BRITT, OF NEW YORK, N. Y., ASSIGNORS TO ELECTRUCK CORPORATION, OF NEW YORK, N. Y., A CORPORATION OF NEW YORK.

BATTERY SUPPORT FOR ELECTRIC VEHICLES.

Application filed April 3, 1922. Serial No. 549,157.

The present invention relates to electrically driven vehicles, and has to do principally with an improved battery cradle or carrier and with the particular means of attaching the cradle to the vehicle body for support.

Electrically propelled road vehicles, such as electric trucks and automobiles, commonly derive their power from a set of storage batteries carried by the vehicle frame, the vehicle being kept in use until the batteries become discharged to such an extent that it is necessary or desirable to have them re-charged. In order that the battery when fully charged may contain a sufficient amount of energy so that the vehicle may be kept in operation for a considerable length of time before it again becomes necessary to charge the battery, the battery unit must be of considerable bulk and weight. The unit is usually made up of a number of individual cells, a sufficient number of which are connected in series to provide the desired voltage and a number of such serially connected sets arranged in parallel to furnish the required current without injury to the battery cells.

The weight of the battery unit with its supporting cradle constitutes a material part of the total weight of the vehicle, and it is accordingly a considerable problem to provide means for safely carrying the battery over all sorts of roads and in all sorts of weather conditions at the same time providing a vehicle frame of such strength as not to be deformed or unduly strained at the points where the weight of the battery unit is supported. This is particularly true on rough roads due to the jumping and jolting of the vehicle, and in this situation the additional problem of providing sufficient clearance beneath the bottom of the battery cradle is presented. That is, if the wheels drop into a rut 6 or 8 inches deep a corresponding clearance under the battery cradle must be provided in order to prevent accident to the battery. A further and serious objection to the use of electrically propelled vehicles is that the removal of the battery unit for charging, or other purposes, is an exceedingly laborious and tedious task which requires the efforts of several persons and which is likely to result in damage to the battery unit, particularly if the workers are inexperienced.

Battery cradles of this general character commonly consist of a frame or body portion provided with hangers positioned at or near the respective corners of the cradle for effecting attachment to the vehicle body. The hangers usually consist of vertical metal strips whose tops are bent downwardly to form hooks adapted to engage with eyes or equivalent elements on the vehicle frame. Due to the jumping and jolting which is encountered in rough roads the hooks are usually some 6 inches in depth to insure that the battery cradle will not be jolted completely out of its support. This construction necessitates a corresponding loss in clearance inasmuch as the battery cradle must during the process of putting it in place on the vehicle, be raised some 6 inches higher than the position which it assumes when hanging normally from its supporting hooks. Due to the difficulty in simultaneously effecting the engagement of all four supporting hooks with their respective cooperating eyes, the cradle is invariably hung in place alone and the batteries subsequently placed in it. A corresponding procedure is followed when the batteries are removed; that is, the battery cells are removed from the cradle without attempting to remove the entire unit at once. For this reason the cradle is commonly provided with one or more sides which may be swung down out of the way. A false bottom consisting of a platform of dimensions substantially identical with the interior section of the cradle is provided to support the individual battery cells, the false bottom being equipped with rollers so that it may be rolled into position after the battery cells have been placed upon it and may be similarly withdrawn when it is desired to remove the batteries. However, the exposure of the false bottom to rain and weather conditions and particularly to the slopping from the battery jars causes it to swell, and it is a difficult and unpleasant task to remove the batteries or to place a new set in position. It is also evident that the provision of the false roller bottom decreases the clearance which may be allowed under the battery cradle by an amount equal to the height of the false bottom and its rollers.

It is an object of this invention to provide a battery cradle or carrier for use in vehicles of the above type which is designed to contain within it the entire set of batteries and in which the entire unit comprising the battery cells and their supporting cradle may be set in place on the vehicle frame or be detached from the frame in a quick and convenient manner by a single person with the aid of a hydraulic lift or similar device, the battery cells being completely contained within the carrier and having no external connections which cannot be permanently soldered in place.

It is also an object to provide a battery cradle of this type which, when supported in operative position, is in no danger of being jolted out of its support on the vehicle frame, yet which in such position rides substantially at the maximum height to which it can be raised, whereby a material amount of clearance at the under side of the battery cradle is gained.

It is a further object to provide a battery supporting member of this type wherein additional clearance is gained inasmuch as the battery cells may be set directly in the body of the cradle without providing a roller bottom or equivalent element.

It is also an object to provide a battery unit for use in electrically driven vehicles which for a given ampere-hour capacity is of materially reduced weight and is supported in such a manner that its weight is distributed over a considerable portion of the vehicle frame rather than being concentrated at the immediate points of support at which the hangers engage.

It is a still further object to provide in a battery supporting system of this type an improved means of ventilation by reason of which accumulated gases may be continuously and conveniently discharged.

We have illustrated a preferred embodiment of our invention in the accompanying drawings, in which—

Figure 1 is a vertical sectional view taken transversely through a portion of a vehicle frame and showing our improved battery cradle attached in operative position;

Fig. 2 is a plan view corresponding to Fig. 1;

Fig. 3 is a side elevation of the apparatus shown in Fig. 1, a portion of the side cover being broken away;

Fig. 4 is a longitudinal sectional view taken on line 4—4 of Fig. 2; and

Fig. 5 is a side view showing our improved battery cradle, the portion of the vehicle frame to which the cradle is attached, and the supporting rod which effects the attachment.

Referring to the drawings, 1 indicates the main frame or chassis of the vehicle structure, and 2 indicates a pair of angles riveted to the members 1 on the respective sides of the vehicle and serving as a support for the battery unit. The battery support or cradle consists of a metal frame work 3, preferably having reinforced corners as indicated at 4, within which rests a wood box or lining 5. The individual battery cells 6 are contained within the box 5. Supporting hangers 7 are associated with the frame work 3 of the cradle, and are provided with eyes 8 at their upper ends through opposite pairs of which pass the supporting bars 9 whose lower edges rest against the horizontal flanges of the supporting members 2, the battery unit being held in position through the cooperation of the hangers 7 and supporting rods 9.

The wood portion 5 of the cradle consists of an ordinary box shaped structure open at the top to receive the batteries, which are assembled within the box before attaching the cradle to the vehicle. The entire set of batteries with their associated connections is contained entirely within the box 5 and accordingly all of the connections may be permanently soldered, there being no necessity for external screw connections or other connections which need be removed for any reason. The battery cells are placed within the lining 5 when the cradle is supported on the platform of a hydraulic lift or similar device which may conveniently be mounted on rollers so that the battery cradle and the cells assembled within it may be wheeled under the vehicle and the battery unit lifted into position by actuating the mechanism of the lift. It is to be noted that the battery cells are positioned directly within the box 5 without the provision of an auxiliary lining or roller bottom which would encroach upon the clearance available between the bottom of the battery cradle and the road bed.

The hangers 7 may conveniently be metal strips secured to opposite sides of the cradle frame 3, as shown, with the closed eyes 8 at their outer ends being formed by bending over the end portion of the strip into a closed loop. The horizontal flanges of the respective members 2 are provided with holes 10 so positioned as to admit the upper ends of the hangers when the battery cradle is raised into position. While the cradle is still supported by the lifting device the rods 9 are inserted through the opposite pairs of eyes 8, and, when the supporting lift is removed, the battery cradle will settle into position on the supporting bars. Thus the final position of support of the battery cradle is but little lower than the maximum height to which it is raised in order to insert the supporting bars 9, and a corresponding increase in clearance under the bottom of the cradle is secured.

At the front and rear of the battery cradle 3 there is a pair of guide members 11 extending transversely of the vehicle between the main beams 1. These members 11 together with the longitudinally extending members 2 constitute the supporting frame work for the battery cradle and lend rigidity to the entire structure. The weight of the battery unit does not fall upon the vehicle frame at four distinct points of support but, on the other hand, is transmitted to the frame throughout the entire length of the supporting bars 9. This feature insures against excessive localized stresses in parts of the frame and guards against any deformation of the frame work which might otherwise result. Each of the bars 9 is provided with a pin stop 12 so that the bar may be quickly inserted and will be positioned accurately relative to the eyes 8 of the hangers by means of the stop which contacts against one of the hangers. For the purpose of locking the entire unit in position a pair of notches 13 is provided on each of the bars 9 to engage with the hanger eyes 8 and together with pins 12, prevent longitudinal movement of the bar.

When the battery cradle with its contained battery cells is wheeled into position under the truck preparatory to attaching the cradle to the vehicle frame, the cradle is so located as to come between the downwardly extending flanges of the transverse members 11. The cradle is then raised until the tops of the eyes 8 are approaching the level of the outwardly extending flanges on the supporting members 2. The lifting device carrying the battery unit is then pushed along transversely of the vehicle until the hanger arms come into contact with the stop 13, which may conveniently be a rod extending longitudinally along one side of the vehicle as shown. In this position the stop rod 13 and the guides 11 will so locate the cradle that the upper ends of the hangers will be in register with the corresponding holes 10 in the flange 2. In this condition the cradle may then be elevated so that the eyes 8 enter the respective holes to a sufficient extent to permit insertion of the supporting bars 9. In order that the battery terminals may not be lifted against the vehicle frame during the process of mounting the cradle, the respective corners of the cradle 3 are formed as upright members 14 whose upper ends project slightly beyond the tops of the battery cells. Thus, if the cradle is elevated to a sufficient extent, the tops of the members 14 will contact with the under side of the vehicle frame and prevent injury to the battery terminals.

The members 14 serve a further purpose in that if the under side of the vehicle body is not in a horizontal position it may nevertheless be lifted into such position by raising the battery cradle against it. For instance, if the loading of the vehicle is such that the rear portion of the frame is considerably lower than the forward portion, the members 14 on the rear of the battery cradle will contact with the under side of the vehicle frame sooner than will those at the forward end of the cradle. If the cradle is lifted further, however, the rear part of the vehicle will be raised under the lifting action of the corner pieces 14 until the forward end of the cradle is also in contact with the vehicle frame. In this position the supporting rods 8 are easily inserted, whereas if the vehicle frame could not be leveled, it would be necessary to provide some means for so tilting the cradle that all of the eyes 8 would project through their corresponding openings 10 a sufficient distance to permit insertion of the supporting rods 9. With this arrangement it is to be noted that the placing of the battery cradle in position on the vehicle, as well as removal of the unit which is already in place, may easily be accomplished by one person with the use of an ordinary jack or hydraulic lift such as is commonly found in factories and repair shops. Side covers or shields 15 for the battery unit may be provided in the form of sheet metal members whose upper ends are bent over as shown and punched out to fit over the upper ends of the hanger eyes 8. These covers 15 are secured in place by sliding the supporting rods 9 in place upon them.

When the battery cradle is in position a small space occurs between the end walls of the wood lining 5 and the transversely extending guide members 11, as seen in Figs. 3 and 4. The movement of the vehicle when in operation will tend to produce a current of air which, as indicated by the arrows, will enter at the front of the battery unit, pass over the tops of the battery cells, and pass out through the space between the wood lining 5 and the guide 11 at the rear of the battery unit. This effects a forced ventilation of the batteries and serves to remove the gases accumulating in the space above the storage cells and to keep the unit cool. This feature is further augmented by the provision of a number of perforations 16 provided in the cover plate 17, which cover is attached to the vehicle frame and may be a flat piece of sheet metal riveted in place or may be a larger sheet having its end portions bent down to form the transverse guides 11. Above the holes 16 a duct 18 is constructed having open ends and extending in the direction of the length of the vehicle. Thus the movement of the vehicle will create a ventilating current along the length of the duct and will serve to drive out a portion of the gases from the chamber above the storage cells and supply fresh air in its stead. Any desired number of such ducts may be provided, and we have shown two of them positioned in parallelism on opposite sides of the center line of the vehicle.

It is to be noted that in a battery cradle embodying our invention it is merely necessary to provide a light steel frame work and an inner lining of wood to contain the battery cells. The total weight of a battery unit constructed in this manner is materially less than the weight of a unit of similar energy capacity constructed in the ordinary manner. It is further to be noted that the clearance underneath the bottom of the battery cradle is very materially increased owing to the fact that no roller bottom or other equivalent structure is employed in the battery cradle, and to the fact that the supporting eyes of the hangers are closed and consequently do not require that the battery be lifted a number of inches higher than its normal position in order that it may be set in place.

We have illustrated a preferred embodiment of our invention, but it is to be understood that certain changes from the structure shown may be made. For instance, the holes through which the hanger eyes 8 pass may be formed as slots extending inwardly from the outside edges of the supporting flanges, the particular guides and stops employed to properly locate the cradle may assume other forms, and other variations in construction may be made within the scope of the appended claims.

We claim:—

1. In an electric vehicle, a battery cradle comprising a containing box having rigidly associated sides, means for attaching said cradle to the vehicle frame, guides for controlling the horizontal movement of said cradle in one direction as it is lifted into position, and a stop for permitting horizontal movement of said cradle in another direction and limiting the extent of said movement whereby said cradle may be accurately located for attachment to the vehicle.

2. In an electric vehicle, a battery cradle comprising a containing box having rigidly associated sides, means for attaching said cradle to the vehicle frame, guides extending transversely of the vehicle body for controlling the location of said cradle longitudinally of the vehicle, and a stop for limiting the movement of said cradle transversely of the vehicle, whereby said cradle may be introduced to said transverse guides and moved into contact with said stop to locate it in proper position beneath the vehicle.

3. In an electric vehicle, a battery cradle comprising a containing box, means for attaching said cradle to the vehicle frame, guides extending transversely of the vehicle body for controlling the location of said cradle longitudinally of the vehicle, a stop for limiting the movement of said cradle transversely of the vehicle, and portions provided at the top of said box for contacting with the vehicle frame when said cradle is raised into its position for attachment, whereby said vehicle may be brought into proper position for the attachment of said cradle.

4. In an electric vehicle, a battery cradle comprising a containing box, supporting hangers on said box, cooperating parts provided on the respective sides of the vehicle frame for receiving said hangers, a common supporting bar extending along each of said parts, heads on said hangers for receiving said bars and maintaining said cradle in position, and locking means provided on said bar for preventing displacement of said cradle from normal position.

5. In an electric vehicle, a battery cradle comprising a containing box having rigidly associated sides, means for attaching said cradle to the vehicle frame, and guides for controlling the horizontal movement of said cradle in one direction as it is lifted into position, said guides extending downwardly from the vehicle in spaced relation to and terminating adjacent the upper portion of the cradle, whereby a small space is provided between the respective guides and the adjacent walls of said cradle to permit a ventilating current to pass above the battery cradle.

6. In an electric vehicle, a battery cradle comprising a containing box, means for attaching said cradle to the vehicle frame, a member mounted above said battery cradle having ventilating holes, and ducts positioned above said ventilating holes extending longitudinally of the vehicle, whereby the movement of the vehicle effects a ventilating current through said ducts.

7. In an electric vehicle, a battery cradle comprising a containing box, supporting hangers on said box, cooperating parts provided on the respective sides of the vehicle frame for receiving said hangers, a supporting bar extending along each of said parts, heads on said hangers for receiving said bars and maintaining said cradle in position, and a member supported by each of said bars for shielding the respective sides of said battery cradle.

In testimony whereof I affix my signature.
BENJAMIN H. BRITT.
In testimony whereof I affix my signature.
WALTER S. WARD.